(12) United States Patent
Di-Crescenzo et al.

(10) Patent No.: US 6,301,664 B1
(45) Date of Patent: Oct. 9, 2001

(54) METHOD AND SYSTEM FOR NON-MALLEABLE AND NON-INTERACTIVE CRYPTOGRAPHIC COMMITMENT IN A NETWORK

(75) Inventors: Giovanni Di-Crescenzo, Morris Township, Morris County, NJ (US); Yuval Ishai, Haifa (IL); Rafail Ostrovsky, Secaucus, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/195,491

(22) Filed: Nov. 18, 1998

Related U.S. Application Data

(60) Provisional application No. 60/065,632, filed on Nov. 18, 1997.

(51) Int. Cl.[7] .................................................. G06F 1/26
(52) U.S. Cl. ......................... 713/189; 713/200; 713/201
(58) Field of Search .................................. 713/165, 166, 713/168, 189, 200, 201

(56) References Cited

U.S. PATENT DOCUMENTS

| 6,219,694 | * | 4/2001 | Lazaridis et al. | 709/206 |
| 6,219,788 | * | 4/2001 | Flavin et al. | 713/194 |
| 6,219,790 | * | 4/2001 | Lloyd et al. | 713/201 |
| 6,219,791 | * | 4/2001 | Blanchard et al. | 713/201 |

* cited by examiner

Primary Examiner—Thomas R. Peeso
(74) Attorney, Agent, or Firm—Joseph Giordano

(57) ABSTRACT

A method and system perform non-malleable and non-interactive commitment of data, which is communicated by a sender to a receiver. At a commitment phase, the sender selects a first string having a first portion and a second portion, and based on the first portion of the first string, establishes a first commitment to an authentication key. The sender divides the second portion of the first string into a set of segments each including two or more sub-segments, and based on the first commitment, selects one of the subsegments in each of the segments. The sender combines the selected sub-segments together, and establishes a second commitment to the data based on the combined selected sub-segments such that the second commitment is equivocable. The sender authenticates the second commitment by using the authenticating key. At a de-commitment phase, the sender de-commits the data and the authentication key.

10 Claims, 5 Drawing Sheets

AUTHENTICATION KEY

ENCODED AUTHENTICATION KEY

PRIVATE STRING

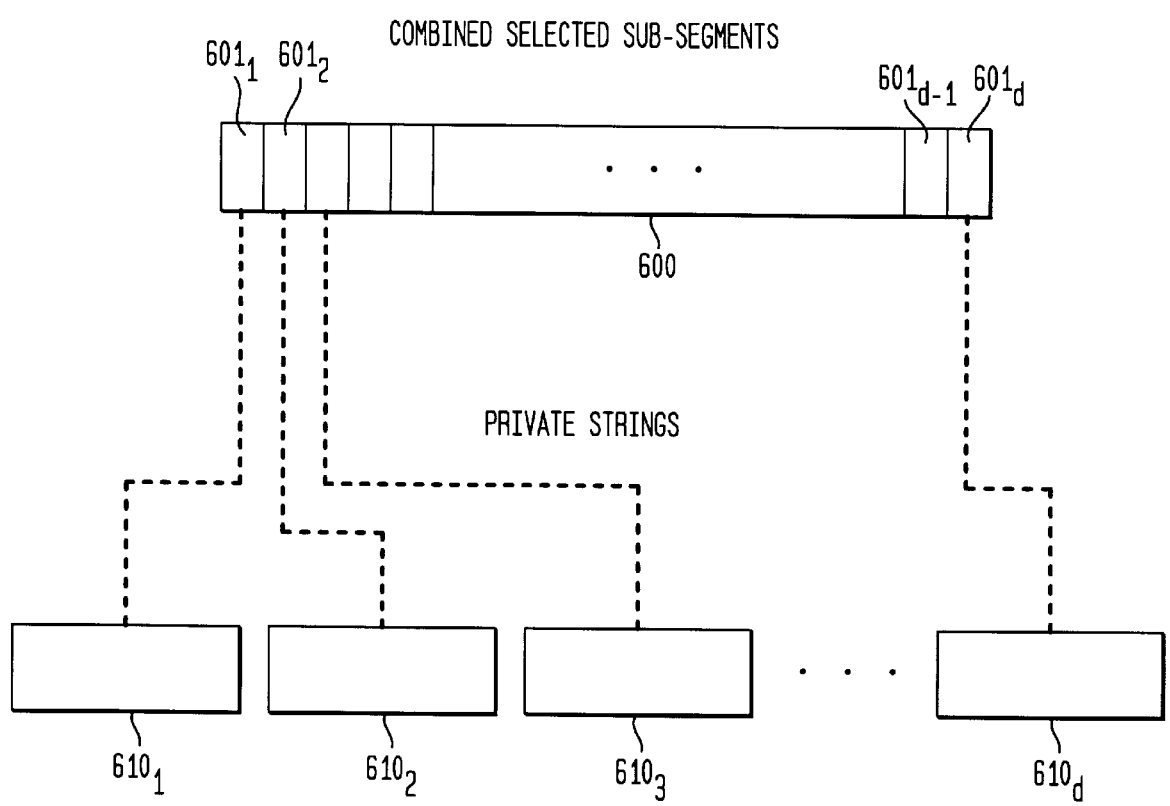

METHOD AND SYSTEM FOR NON-MALLEABLE AND NON-INTERACTIVE CRYPTOGRAPHIC COMMITMENT IN A NETWORK

CROSS-REFERENCE TO RELATED APPLICATIONS

This application claims the benefit of U.S. Provisional Application No. 60/065,632, filed Nov. 18, 1997, the contents of which are hereby incorporated by reference.

BACKGROUND OF THE INVENTION

The present invention relates generally to cryptography, and more particularly, to a method and system for non-malleable and non-interactive cryptographic commitment in a network.

The widespread use of computers and computer networks has heightened the need for security. The explosive growth of, for example, the Internet, including electronic commercial transactions and funds transfer, has increased the need for security in communications, data storage and management. It has also served to demonstrate that designing secure communication protocols is a complex issue, requiring considerable expertise and research.

Although the Internet has become the most economical means for communication between two or more remote sites, it does not provide protection for transmitted information. As a result, cryptographic protocols have been developed for securing electronic communication between two or more sites.

A fundamental cryptographic protocol is a "commitment" protocol. A commitment protocol generally specifies the steps for secured communication between two probabilistic polynomial-time players (i.e., a sender and a receiver). The communication between the sender and the receiver includes a commitment phase and a de-commitment phase.

In the commitment phase, based on information a sender desires to communicate to a receiver, the sender builds and sends to the receiver a commit message, such that when the receiver receives the commit message the receiver cannot retrieve the information from the commit message. In the de-commitment phase, the sender builds and sends to the receiver a de-commit message, which enables the receiver to retrieve the information from the commit message, such that the receiver is assured that the retrieved information is the information the sender committed to in the commitment phase.

The commitment protocol is used in a wide variety of cryptographic applications, including electronic contract signing (or bidding) and multi-party computations. In an electronic contract bidding application, two or more senders, for example bidders, communicate via, for example the Internet, bids on a contract to a receiver. In such an application, each sender commits to a bid by sending a commit message to the receiver. Once the receiver receives all of the bids, each sender de-commits its respective bid by sending a de-commit message to the receiver. The receiver then determines to grant the contract to a sender that, for example, submits the lowest bid.

In an electronic contract bidding application, one problem with known commitment protocols is that the communication between a sender and a receiver is malleable. Malleable means that even if the particular commitment protocol used by each sender is computationally secure against any polynomially-bounded receiver, a sender can still potentially intercept another sender's commit message and build a related commitment message based on the intercepted commit message without determining the underlying bid in the intercepted commit message. Furthermore, the intercepting sender can also intercept the other sender's de-commit message and build a related de-commit message, such that the related de-commit message includes, for example, a lower bid than the intercepted de-commit message. Hence, the intercepting sender can underbid the other sender without explicitly determining the other sender's bid.

To address the problem of malleable commitment, D. Dolev, C. Dwork, and M. Naor, "Non-Malleable Cryptography," in Proceedings of Symposium On The Theory Of Computing (1991), discloses a non-malleable commitment protocol. The Dolev, Dwork and Naor protocol, however, is interactive, and thus inefficient, as it requires a logarithmic number of rounds of two way communication between a sender and a receiver. In addition, the protocol requires costly zero-knowledge proofs, which renders communication between the sender and receiver inefficient.

A. De Santis and G. Persiano, "Zero-Knowledge Proofs Of Knowledge Without Interaction," in the Proceedings of IEEE Foundations Of Computer Science (1996), disclose a non-interactive zero-knowledge proof of knowledge. Using the De Santis and Persiano techniques, one can implement a non-malleable commitment protocol that is non-interactive. This commitment protocol, however, can only be implemented using dense crypto-systems that are based on one or more strong algebraic assumptions. Furthermore, like the Dolev, Dwork and Naor protocol, the De Santis and Persiano commitment protocol requires costly zero-knowledge proofs.

M. Bellare and P. Rogaway, "Random Oracles Are Practical: A Paradigm For Designing Efficient Protocols," in the Proceedings of ACM Conference On Computer And Communication Security (1993), discloses a non-malleable and non-interactive commitment protocol, which uses cryptographic hash functions that behave as random oracles. The Bellare and Rogaway protocol, however, does not enable one of ordinary skill in the art to implement (or even define) such random oracles with the requisite properties for complexity-theoretic assumptions. Furthermore, because the protocol is based on heuristic assumptions, the communication between a sender and a receiver is not as secure as when using other known commitment protocols.

Therefore, it is desirable to have a method and system for overcoming the above and other disadvantages of the prior art.

DESCRIPTION OF THE INVENTION

Methods and systems consistent with the present invention perform non-malleable commitment to data, which is communicated by a sender to a receiver. At a commitment phase, the sender selects a first string having a first portion and a second portion, and based on the first portion of the first string, establishes a first commitment to an authentication key. The sender divides the second portion of the first string into a set of segments each including two or more sub-segments, and based on the first commitment, selects one of the sub-segments in each of the segments. The sender combines the selected sub-segments together, and establishes a second commitment to the data based on the combined selected sub-segments such that the second commitment is equivocable. The sender authenticates the second commitment by using the authenticating key. At a de-commitment phase, the sender de-commits the data and the authentication key.

Methods and systems consistent with the present invention have two advantages over the prior art. First, such methods and systems are non-interactive, and thus efficient, as a sender engages in a one-way communication with a receiver. Second, such methods and systems do not require costly zero-knowledge proofs and/or strong algebraic assumptions for securing the communication between the sender and the receiver.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BRIEF DESCRIPTION OF THE DRAWINGS

In the Figures:

FIG. 6 is a block diagram of selected sub-segments in a randomly selected public string in accordance with an embodiment of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
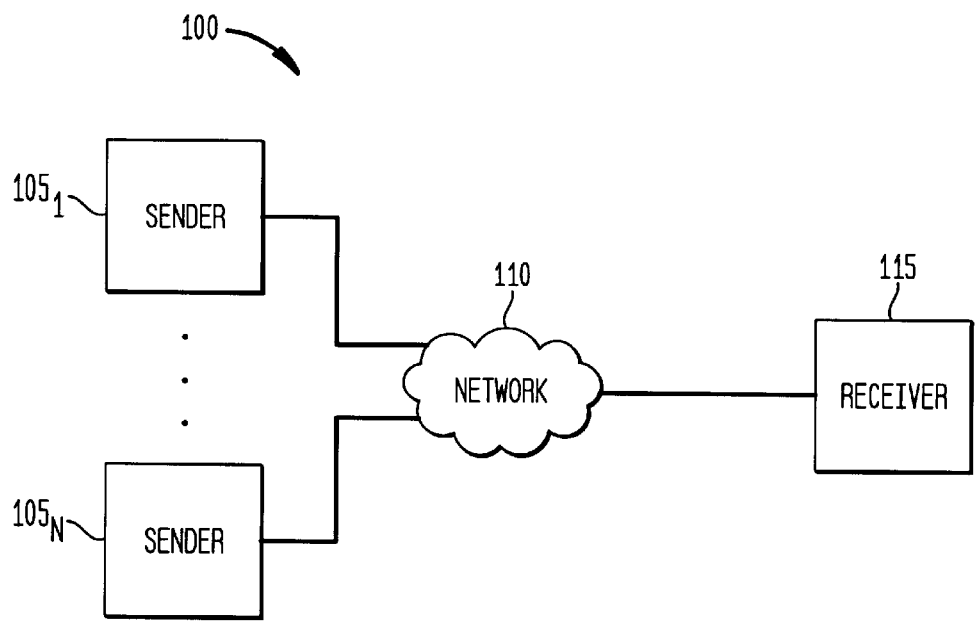
FIG. 1 illustrates a system for non-malleable and non-interactive commitment, which includes N senders and 1 receiver, in accordance with an embodiment of the invention.

FIG. 1 illustrates a system 100 for non-malleable and non-interactive commitment in accordance with an embodiment of the invention. System 100 includes N senders $105_1$ through $105_N$ connected via network 110 to a receiver 115. Network 110 comprises any conventional communications network either internal or external, for affecting communication between senders $105_1$–$105_N$ and receiver 115. Network 110 may comprise, for example, an internal local area network or a large external network, such as the Internet.

Senders $105_1$–$105_N$ each comprise any form of computer capable of generating off-line or on-line messages for non-malleable commitment to data communicated with receiver 115. For example, senders $105_1$–$105_N$ may each communicate via network 110 to receiver 115 in a non-interactive manner. In one embodiment, each sender $105_1$–$105_N$ communicates data, for example a respective bid on a contract, by sending a commit message to receiver 115, such that the rest of the senders $105_1$–$105_N$ cannot under bid the contract by intercepting the commit message and building a related commit message without knowledge of the underlying bid.

As shown below, in accordance with an embodiment of the invention, sender $105_1$ prevents senders $105_2$–$105_N$, who may intercept sender $105_1$'s commit message, from building a related commit message, without the knowledge of sender $105_1$'s bid. Furthermore, when sender $105_1$ de-commits the bid by, for example, sending a de-commit message to receiver 115, sender $105_1$ prevents one or more senders $105_2$–$105_N$, who may intercept sender $105_1$'s de-commit message, from building a de-commit message that is related to sender $105_1$'s de-commit message. Hence, sender $105_1$ is assured that senders $105_2$–$105_N$ cannot underbid sender $105_1$'s bid by building commit and de-commit messages that are related to sender $105_1$'s commit and de-commit messages.

Figure 2:
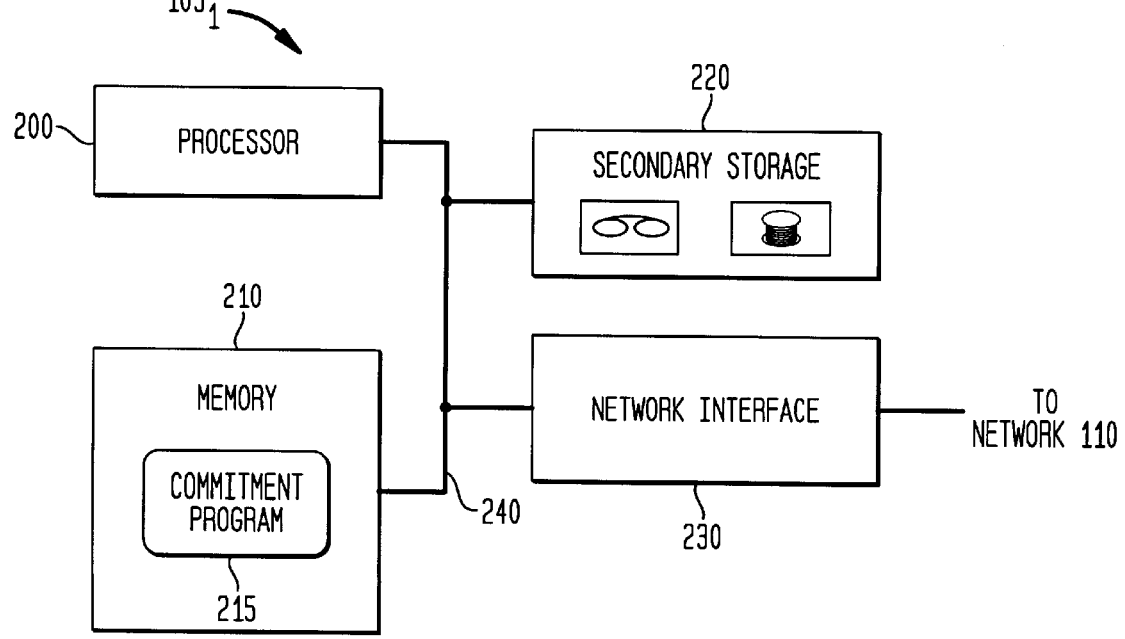
FIG. 2 is a block diagram of a sender in accordance with an embodiment of the invention.

FIG. 2 is a block diagram of sender $105_1$ in accordance with an embodiment of the invention. Sender $105_1$ comprises a processor 200 connected via bus 240 to a memory 210, secondary storage 220, and network interface card 230. Memory 210 comprises a commitment program 215 that includes instructions in the form of software that processor 200 executes. Commitment program 215 sends to and receives from receiver 115 messages via network interface card 230, which interfaces with network 10.

Secondary storage 220 comprises a computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Figure 3:
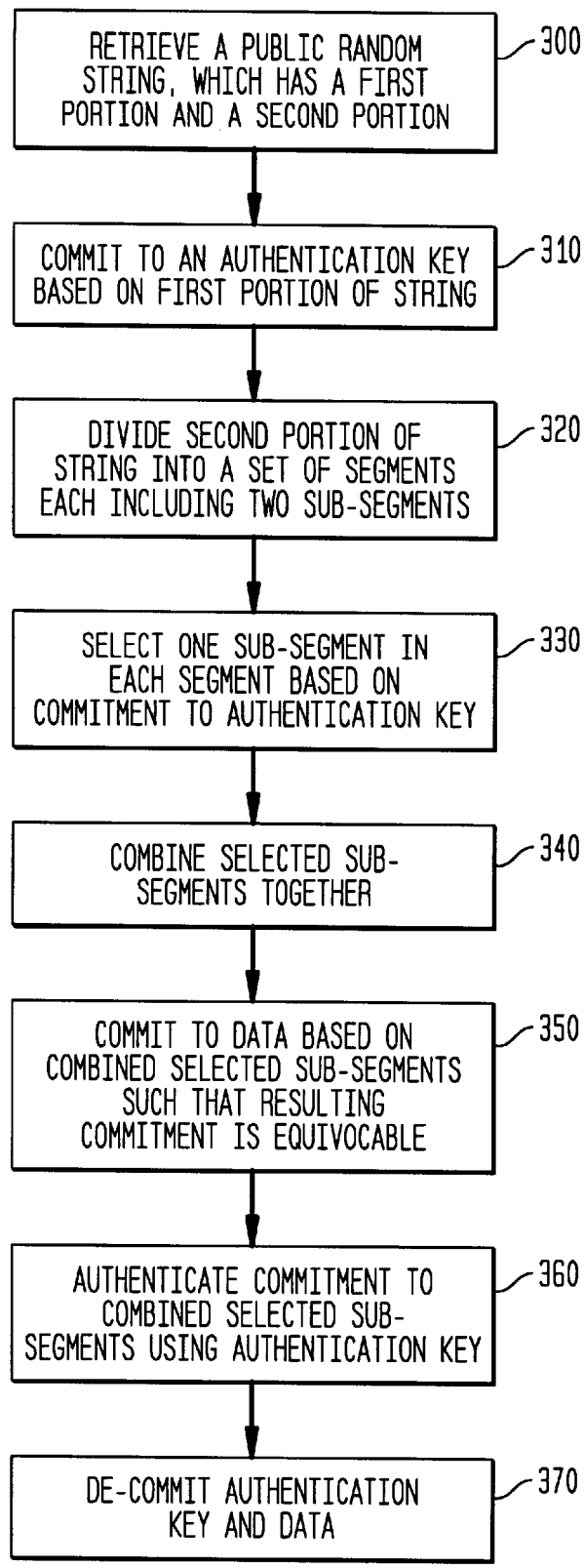
FIG. 3 is a flow chart of the steps performed by a sender in accordance with an embodiment of the invention.
Figure 4A:
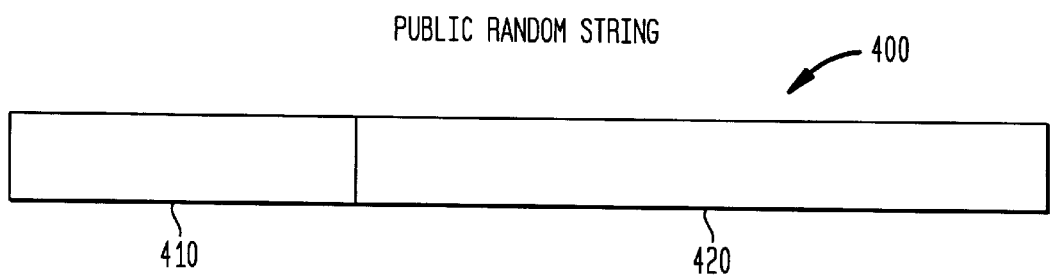
FIGS. 4a and 4b are block diagrams of a randomly selected public string in accordance with an embodiment of the invention.

FIG. 3 is a flow chart of the steps commitment program 215 in sender $105_1$ performs for non-malleable commitment to data, for example a sequence of d bits representing a bid on a contract, which sender $105_1$ desires to communicate to receiver 115, in accordance with an embodiment of the invention. As shown in FIG. 4a, commitment program 215 retrieves from memory 210 a random string 400, which is also known to senders $105_2$–$105_N$ and receiver 115 (step 300). Random string 400 includes a sequence of, for example, $4n+24dn^2$ bits, where n is H- predetermined according to a desired level of security. Commitment program 215 divides random string 400 into a first portion 410 and a second portion 420. First portion 410 includes a sequence of, for example, 4n bits, and second portion 420 includes a sequence of, for example, $24dn^2$ bits.

Figure 5A:
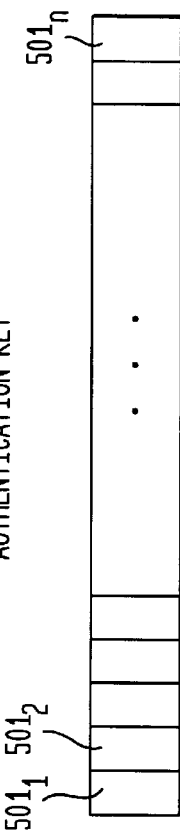
FIGS. 5a, 5b, and 5c are block diagrams of an authentication key, an encoded authentication key, and a private string, respectively, in accordance with an embodiment of the invention.
Figure 5B:
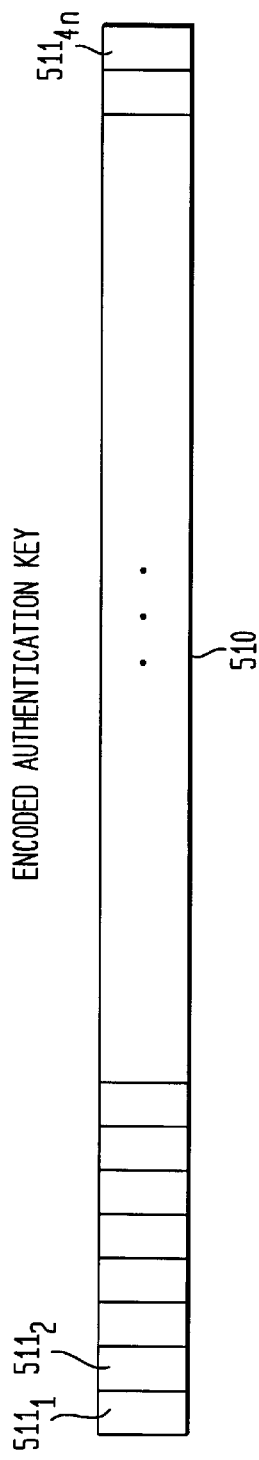
Figure 5C:
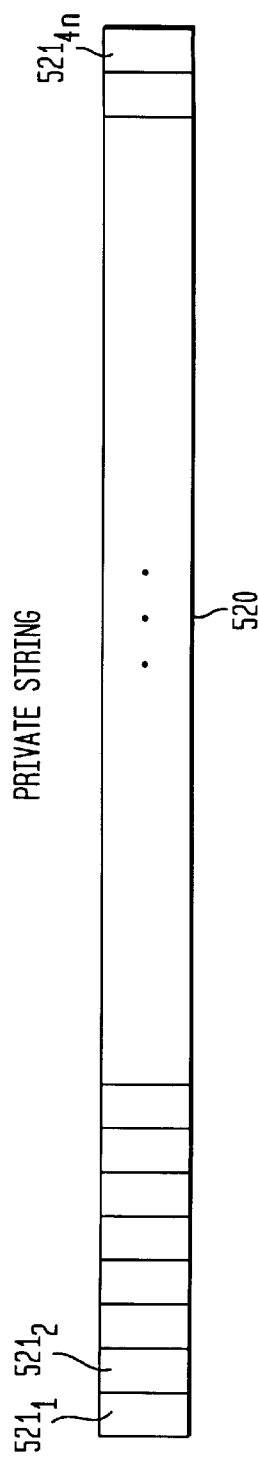

Based on first portion 410 of random string 400, commitment program 215 commits to an authentication key 500 (shown in FIG. 5a), which includes a sequence of n bits $501_1$ through $501_n$, using any known commitment protocol (step 310). Commitment program 215 builds a first commit message as follows: As shown in FIG. 5b, Commitment program 215 encodes authentication key 500 into an encoded authentication key 510, using, for example, the encoding algorithm disclosed in J. Justesen in "A Class Of Constructive Asymptotically Good Algebraic Codes," in IEEE Transactions on Information Theory, Vol. 18, (1972), which is incorporated herein in its entirety by reference. Encoded string 510 includes a sequence of, for example, 4n bits $511_1$ through $511_{4n}$. Commitment program 215 then generates a private string 520 (shown in FIG. 5c) by inputting a random seed into a pseudo-random string generator. Private string 520 includes a sequence of, for example, 4n bits $521_1$ through $521_{4n}$.

For each 0 bit in first portion 410 of random string 400, commitment program 215 inserts the bit in private string 520 that corresponds to the positional order of the 0 bit in first portion 410 at a position in the first commit message that corresponds to the positional order of the 0 bit in first portion 410.

For each 1 bit in first portion 410, commitment program 215 performs, for example, a bitwise exclusive OR operation on the bit in private string 520 that corresponds to the positional order of the 1 bit in first portion 410 and the bit in encoded authentication key 510 that corresponds to the positional order of the 1 bit in first portion 410. Commitment program 215 inserts the bit resulting from the bitwise exclusive OR operation at a position in the first commit message that corresponds to the positional order of the 1 bit in first portion 410. Commitment program 215 then sends the first commit message to receiver 115.

Figure 4B:
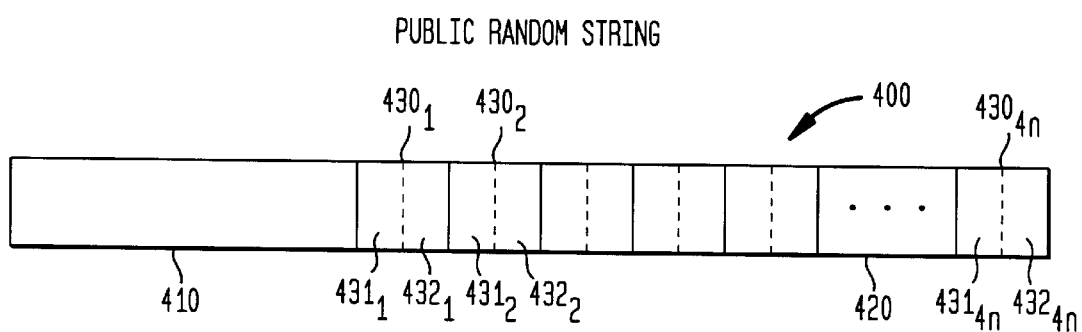

As shown in FIG. 4b, commitment program 215 then divides second portion 420 of random string 400 into a set of segments $430_1$ through $430_{4n}$ of, for example, equal length (step 320). Commitment program 215 then divides each segment $430_1$–$430_{4n}$ into a first sub-segment and a second sub-segment, which are of, for example, equal length. For example, commitment program 215 divides segment $430_1$ into a first sub-segment $431_1$ and a second sub-segment $432_1$ as shown in FIG. 4b. Accordingly, commitment program 215 divides segments $430_1$–$430_{4n}$ into first and second sub-segments $431_1$–$431_{4n}$ and $432_1$–$432_{4n}$, respectively.

Based on the first commit message of step 310, commitment program 215 selects a sub-segment in each segment. For example, for the 0 bits in the first commit message, commitment program 215 selects the corresponding first sub-segments $431_1$–$431_{4n}$. Similarly, for the 1 bits in the first commit message, commitment program 215 selects the corresponding second sub-segments $432_1$–$432_{4n}$.

Commitment program 215 combines the selected sub-segments by, for example, performing a bitwise exclusive OR operation on the selected sub-segments (step 340). As shown in FIG. 6, the resulting combined selected sub-segments 600 includes a sequence of d portions $601_1$ through $601_d$, which are of, for example, equal length. As shown below, based on combined selected sub-segments 600, commitment program 215 commits to data, which sender $105_1$ desires to communicate to receiver 115, such that the resulting commitment is equivocable.

A commitment is equivocable when the associated commitment message is, for example, computationally indistinguishable from a commit message that could be committed as more than one possible data. D. Beaver, "Adaptive Zero-Knowledge And Computational Equivocations," Proceedings of Foundations On Computing Science (1996), discloses the requirements for an equivocable commitment, which are incorporated herein in their entirety by reference.

Based on combined selected sub-segments 600, commitment program 215 commits to the data by building an equivocable commit message as follows: As shown in FIG. 6, for the sequence of d portions $601_1$–$601_d$ in combined selected sub-segments 600 and the sequence of d bits in the data, commitment program 215 generates corresponding private strings $610_1$ through $610_d$, respectively, by, for example, inputting corresponding random seeds into a pseudo random string generator. Each private string $610_1$–$610_d$ includes a sequence of, for example, 3n bits.

For each 0 bit in the data, commitment program 215 inserts the 0 bit's corresponding private string $610_1$–$610_d$ at a position in the second commit message that corresponds to the positional order of the 0 bit in the data.

For each 1 bit in the data, however, commitment program 215 performs, for example, a bitwise exclusive OR operation on the 1 bit's corresponding private string $610_1$–$610_d$ and the 1 bit's corresponding section $601_1$–$601_d$ in combined selected sub-segments 600. Commitment program 215 inserts the resulting string at a position in the second commit message that corresponds to the positional order of the 1 bit in the data. Commitment program 215 then sends the resulting equivocable second commit message to receiver 115.

Commitment program 215 then authenticates the second commit message using authentication key 500. For example, commitment program 215 inputs authentication key 500 as a seed into a pseudo random string generator, which outputs a private string that includes a sequence of, for example, $24dn^2$ bits. Commitment program 215 then divides the private string into a first portion and a second portion. The first and second portions of the private string each include a sequence of $12dn^2$ bits. Commitment program 215 multiplies the equivocable commit message by the first portion of the private string, and adds the string resulting from the multiplication to the second portion of the private string. Commitment program 215 then sends the resulting string to receiver 115.

Finally, commitment program 215 de-commits authentication key 500 and the data by, for example, sending to receiver 115 authentication key 500, the seeds used to build the second commit message, and the data. Receiver 115 then verifies authentication key 500 and the data received from sender 105, against the first commit message and the second commit message, respectively, which it has received from sender $105_1$.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for non-malleable commitment to data communicated by a sender to a receiver, said method comprising the steps of:

selecting a first string having a first portion and a second portion;

establishing, based on the first portion of the first string, a first commitment to an authentication key;

dividing the second portion of the first string into a set of segments each including two or more sub-segments;

selecting, based on the first commitment, one of the sub-segments in each of the segments, and combining the selected sub-segments together;

establishing a second commitment to the data based on the combined selected sub-segments such that the second commitment is equivocable; and authenticating the second commitment using the authenticating key.

2. The method of claim 1, wherein the step of selecting the first string comprises the step of randomly selecting the first string.

3. The method of claim 1, wherein the step of establishing the first commitment comprises the steps of:

generating a second string based on a random seed;

encoding the authentication key;

building a first commitment message that includes for each 0 bit in the first portion of the first string a corresponding first bit in the second string and that includes for each 1 bit in the first portion of the first string a corresponding second bit, wherein the corresponding second bit is determined by performing a bitwise exclusive OR operation on a corresponding third bit in the second string and a corresponding fourth bit in the encoded authentication key.

4. The method of claim 1, wherein the combining step comprises the step of performing a bitwise exclusive OR operation on the selected sub-segments.

5. The method of claim 1, wherein the step of establishing the second commitment comprises the steps of:

building a second commitment message that is computationally indistinguishable from a third commitment message.

6. The method of claim 1, wherein the authenticating step comprises the steps of:

generating, based on the authentication key, a second string having a first portion and a second portion;

multiplying the second commitment with the first portion of the second string; and adding result of the multiplying step to the second portion of the second string.

7. The method of claim 1 further comprising the step of:

establishing a de-commitment for the data.

8. The method of claim 5, wherein the step of building the second commitment message comprises the steps of:

generating a second string based on a random seed; and including in the second commitment message the second string for each 0 bit in the data; and including in the second commitment message a third string for each 1 bit in the data, wherein the third string is determined by performing a bitwise exclusive OR operation on the second string and the combined selected sub-segments.

9. The method of claim 7, wherein the step of establishing the de-commitment comprises the step of:

sending to the receiver the authentication key and the data.

10. A computer-readable medium capable of configuring a sender to perform a method for non-malleable commitment to data communicated by the sender to a receiver, said method comprising the steps of:

selecting a first string having a first portion and a second portion;

establishing, based on the first portion of the first string, a first commitment to an authentication key;

dividing the second portion of the first string into a set of segments each including two or more sub-segments;

selecting, based on the first commitment, one of the sub-segments in each of the segments, and combining the selected sub-segments together;

establishing a second commitment to the data based on the combined selected sub-segments such that the second commitment is equivocable; and authenticating the second commitment using the authenticating key.

* * * * *